United States Patent [19]
Capossela et al.

[11] 3,870,806
[45] Mar. 11, 1975

[54] METHOD FOR IMPROVING TEXTURE OF BREAD/BREAD CRUMBS

[75] Inventors: Anthony C. Capossela, Tarrytown; Michael T. McGuire, Elmhurst; Gordon C. Smith, Congers; Joseph D. Albaum, Pleasantville, all of N.Y.

[73] Assignee: General Foods Corporation, White Plain, N.Y.

[22] Filed: Aug. 16, 1972

[21] Appl. No.: 281,099

[52] U.S. Cl............... 426/152, 426/128, 426/205, 426/221, 426/343, 426/465, 426/473
[51] Int. Cl............................................. A21d 13/00
[58] Field of Search ........... 426/152, 205, 221, 343, 426/473, 465

[56] References Cited
UNITED STATES PATENTS

| | | | |
|---|---|---|---|
| 2,931,320 | 4/1960 | Bandel | 99/90 |
| 2,953,460 | 9/1960 | Baker | 99/90 |
| 3,720,522 | 3/1973 | Nakagami | 99/171 C |

FOREIGN PATENTS OR APPLICATIONS

| | | |
|---|---|---|
| 206,632 | 11/1923 | Great Britain |
| 326,772 | 3/1930 | Great Britain |

OTHER PUBLICATIONS

Marsh "The Good Houskeeping Cook Book," Pages 341–346, 477, 1949, Rinehart & Company, Inc., N.Y..
Meta Given's "Modern Encyclopedia of Cooking," Pages 1,222–1,224, Vol. II, 1949, J. G. Ferguson & Associates, Chicago, Ill., Kellogg, U.S. Trademark, 767,686, Mar. 31, 1964.

*Primary Examiner*—Raymond N. Jones
*Attorney, Agent, or Firm*—Thomas V. Sullivan; Bruno P. Struzzi

[57] ABSTRACT

An instant stuffing mix is disclosed prepared from dried bread crumbs derived from bread made by the so-called "Continuous Process." The stuffing mix also contains seasonings, spices and may contain dehydrated vegetables and/or fruit. The Continuous Process bread is conditioned for use in a stuffing mix by subjecting the baked bread to temperatures of up to 375°F for a period of time sufficient to strengthen the fragile cellular walls of the bread.

8 Claims, No Drawings

METHOD FOR IMPROVING TEXTURE OF BREAD/BREAD CRUMBS

BACKGROUND OF THE INVENTION

This invention relates to an instant stuffing mix. The stuffing may be prepared in as little as about 10 minutes by simple heating of the mix on the stove with water and optionally an oil or a fat. The cooked stuffing of this invention has textural, flavor and color characteristics comparable to home prepared and packaged stuffing which are prepared by cooking over long periods of time in intimate association with the poultry, meat or sea food with which it is to be served.

Poultry or sea food stuffing is ordinarily prepared by mixing a farinaceous ingredient, such as bread pieces, with spices and/or vegetables and sufficient water to form a moist cohesive mass. This mass is then placed in the visceral cavity of poultry or fish and cooked for a prolonged period of time. Cooking in intimate contac with the poultry or sea food is considered necessary if the stuffing is to have the soft texture, flavor and color normally associated with stuffing. Even in the case of packaged stuffing, manufacturers recommend cooking in intimate contact with poultry or fish in order to obtain the proper texture moisture content and flavor.

This requirement that stuffing ingredients be cooked with the poultry or fish has obvious disadvantages. For example, the consumer must take the time to fill the visceral cavity of fish or poultry and often the cavity must be sewn or otherwise sealed to prevent the stuffing from falling out or drying out. Also, the desire to serve stuffing with the meal imposes severe limitations on the method by which the meat or fish is cooked. For example, stuffed poultry must be roasted or baked, intact. The consumer cannot conveniently serve freshly prepared stuffing with fried or boiled poultry because these methods of cooking are not conducive with the traditional method for preparing stuffing. A further disadvantage associated with the traditional method for preparing stuffing is that the stuffing may become unpalatable after several days or storage in the visceral cavity of the poultry. This may occur as the result of bacteriological infestation in cases where the poultry has not been properly cleaned or has been undercooked.

It has recently been discovered that an instant stuffing composition having textural, flavor and organoleptic characteristics of traditional baked stuffing can be prepared in as little as 10 minutes and without the need for any cooking in intimate association with fish or fowl. According to the disclosure of commonly assigned copending application Ser. No. 163,437, filed July 16, 1971, such an instant stuffing is possible where the dried farinacous crumb components are derived from yeast-leavened cornbread, or mixtures of yeast-leavened white and/or whole wheat and/or corn breads. It is pointed out in that application that bread crumb derived from bread prepared according to the so-called "Modern" or "Continuous Process" is not satisfactory inasmuch as the fragile cellular walls of continuous process bread breakdown when the crumb is hydrated giving rise to a pasty and unsatisfactory stuffing. Even stuffing prepared by the traditional method may be texturally objectionable when made from continuous process bread.

Most of the non-bake shop breads commercially available today are prepared by the continuous processes, such as are disclosed in U.S. Pat. Nos. 2,931,320 or 2,953,460. Typically, the continuous process involves the initial preparation of an aqueous, yeast fermented brew, continuous mixing of the brew with other bread components such as flour, shortening, milk, an oxidant, sugars, salt and the like in a preliminary mixing zone to provide a uniform preliminary dough mixture. The dough mixture is then continuously worked in a dough developing zone under severe agitation such that a fully developed dough is rapidly provided. The dough is then extruded directly into bread pans, proofed and baked.

Unlike bread prepared by the "Straight Dough" method which has a coarse, irregular structure, continuous process bread has a very fine, close grained and silky texture. It is probably best characterized as having a soft, fine, fragile and thin walled internal structure similar to that of a pound cake. This fragile structure appears to break down and lose what little body it has when hydrated as would be the case where the bread is to be used in the preparation of stuffing. Thus it is not totally satisfactory from a textural standpoint when used for traditional stuffing and most unsatisfactory when used in the preparation of an instant stuffing such as disclosed in copending application Ser. No. 163,437, mentioned above.

It is accordingly an object of this invention to provide a method for conditioning continuous process bread to strengthen the cellular structure of the bread and render it more texturally suitable for use in the preparation of stuffing.

A second object of this invention is to provide an instant stuffing using continuous process bread which can be prepared separately from the meat or fish with which it is to be served.

A third object of this invention is to provide an instant stuffing which can be prepared in a matter of about 10 to 20 minutes and which has textural, moisture and flavor characteristics comparable to traditional baked stuffing.

SUMMARY OF THE INVENTION

It has now been discovered that an instant stuffing having the textural, moisture and flavor characteristics associated with traditional baked stuffing can be prepared by providing a first component comprising crumb derived from a conditioned continuous processed bread. The continuous processed bread is conditioned by subjecting commercially available bread which contains at least about 30 percent by weight moisture, usually 35 –38 percent by weight moisture, to temperatures of up to 375°F and for a period of time sufficient to strengthen the fragile cellular structure of the bread. Preferably, the bread is subjected to temperatures within the range of about 200° to 375°F for a period of time sufficient to reduce the moisture content of the bread to below about 10 percent by weight without any significant browning or toasting of the bread. After conditioning, the bread is ground to the appropriate particle size which will be hereinafter described. The instant stuffing of this invention also includes a second component comprising a mixture of spices, seasonings and flavorings in combination optionally with dehydrated vegetables and/or dehydrated fruit. The second component may also contain meat or a meat flavored protein analog.

The stuffing mix is most conveniently prepared by mixing the second component comprising the spices and other ingredients with a certain amount of water and optionally a fat or oil, bringing the mixture to a boil and simmering the mixture for several minutes. The first component comprising the conditioned continuous processed bread crumbs is then added, with stirring, and the mixture let stand for several minutes.

DETAILED DESCRIPTION OF THE INVENTION

White bread, whole wheat bread and corn bread prepared by the continuous process may be used as starting material in preparing the crumb used in the stuffing mix. The term "White Bread" as employed herein refers to bread prepared using a ground flour, preferably wheat flour, which has been freed from bran coat, or bran coat and germ. The term "Whole Wheat Bread" is intended to refer to bread prepared using ground wheat flour which contains the bran coat, or the bran coat and germ. For the purposes of this invention, this term also encompasses bread prepared using a mixture of bran free flour and bran containing flour. Similarly, the term "Corn Bread" refers to bread prepared using corn flour or corn meal, mixtures of these, and mixtures of these with other flour. Commercially available continous processed sliced bread is particularly suitable.

Next, the sliced bread is conditioned by subjecting it to temperatures in the range of 200° to 375°F for a period of time sufficient to strengthen the cellular structure of the bread without causing toasting or excessive browning and sufficient to reduce the moisture content of the bread to below about 10 percent by weight, preferably below about 7 percent by weight. For best results, it has been found that the bread should be subjected to temperatures of at least about 250°F during at least part of the conditioning process.

It is not known precisely what changes the conditioning process effect in the cellular wall structure of the bread except that the structure is considerably strengthened or toughened. It has been postulated that the conditioning process acts on the protein or gluten present in the cellular walls causing a more complete denaturing or cross-linking thereof. It is also possible that the toughening of the wall structure is caused by crystalization of the sugar or complete gelatinazation of incompletely gelatinized starch. The effect may be a combination of all of these factors. In any event, heat in excess of 200°F, preferably in excess of 250°F, appears to be necessary to properly condition the bread. Where temperatures of less than 200°F are employed and the bread is dried to less than 10 percent moisture, the resulting crumb gives rise to an unsatisfactory very soft and pasty stuffing composition when hydrated.

Conditioning may be carried out using any drying device capable of achieving the required temperatures. Preferably, drying is carried out using a continuous belt circulating air dryer, such as a Procter and Schwartz belt dryer. The heat source may be forced hot air, microwave or infrared. In the preferred embodiment bread in the form of ½ inch slices or roughly ½ inch chunks is subjected to higher temperatures in the beginning of the conditioning process (250° to 375°F) and lower temperatures toward the end (200° to 250°F) as this tends to prevent excessive browning or toasting of the bread as the moisture level drops. Browning may also be checked by reducing the amount of sugar and/or milk present in the bread formulation.

The amount of time required to properly condition the bread will vary as a function of the method of drying, the temperature and the amount of circulating air to which the bread is exposed. Where a continuous belt forced air dryer is employed, bread can be properly conditioned to below about 10 percent by weight moisture at tempertures within the range of 200° to 375°F in about 10–20 minutes. Where the heat source is infrared or microwave, conditioning can be achieved in a period of 5 to 10 minutes.

The particles size distribution of the dried conditioned crumb used in this invention is a significant factor in the preparation of a stuffing mix which will readily hydrate to the proper texture and mouthfeel. Bread crumbs of the appropriate particle size distribution are prepared by grinding the dried conditioned bread and screening to the desired particle size. Crumb having a particle size larger than 2 U.S. mesh (½inch screen size) does not uniformly hydrate in a short period of time with the result that dry, semi-dry and moist areas may be found within the same sample. Crumb having a particle size smaller than 50 U.S. mesh tends to over hydrate and become slimy or pasty. For the purposes of this invention it has been found that the particle size distribution of the crumb should be such that at least about 95 percent by weight of the crumb passes through a 2 mesh screen and no greater than about 5 percent by weight passes through a 50 mesh screen. It is within this range of particle size distribution that the proper balance of texture, moistness and mouthfeel is obtained. Preferably, at least 50 percent by weight of the crumb component ranges from about 3 to 14 mesh in size.

The preferred crumb source for the stuffing mix of this invention is crumb prepared from conditioned continuous process of white bread. Stuffing based on white bread crumb has the most pleasing organoleptic characteristics. Stuffing prepared from conditioned whole wheat bread crumb is also suitable although many consumers feel that it is somewhat dry to the taste. The flavor, color and texture of the stuffing may be varied by forming blends of the various conditioned crumb, for example, white crumb and whole wheat, white crumb and corn, or corn and whole wheat. These may be blended in any proportion to suit taste. The farinacous component of the stuffing mix may also comprise a blend of the conditioned crumb disclosed herein with crumb prepared from bread which has been processed by the so-called Straight Dough and "Sponge Dough" methods. Crumb may be prepared from bread processed by these latter two methods by drying the bread under moderate conditions, say 150°F for 30 to 40 minutes, until the moisture content is less than about 10 percent by weight and grinding and screening the bread to the particle size mentioned above.

In addition to the crumb already described, the farinaceous component of the stuffing may also include minor amounts of dried crumb derived from other sources such as rye bread, graham crackers, English Muffins, doughnuts, potato chip fines, and the like. Crumb from these sources may be used to alter the texture, taste and color of the basic crumb to suit consumer preference.

The second component of the stuffing mix of this invention comprises a mixture of condiments, flavors and pre-cooked dehydrated vegetables and/or dehydrated fruit. The particular condiments and other ingredients used in this second component will depend on the nature of the meat or fish with which the stuffing is to be served, and the flavor desired in the stuffing. Pre-cooked vegetables which may be used include rice, potato, dehydrated onion, green or red peppers, parsley, celery, carrots and the like. Meat flavoring such as poultry seasoning, chicken seasoning, beef, bacon or pork flavoring is added where appropriate. The composition may also include particles of a meat flavored protein analog such as beef, chicken or bacon flavored protein. Dehydrated fruit pieces such as dehydrated apples, pears, apricots, prunes, raisons, and the like may be substituted for all or part of the vegetable present in the stuffing composition. This second component may also contain a fat or oil in powdered form such as an encapsulated spray-dried butter, animal fat or vegetable fat. Where such an ingredient is present, the amount of fat or oil which may be added separately before cooking the stuffing may be correspondingly reduced.

The stuffing mix is most conveniently prepared from a two package system: One pouch containing the farinaceous component and the second pouch containing the spices, flavorings, vegetables, fruit and other ingredients which might be present. The contents of the flavor pouch are first combined with an amount of water in a saucepan sufficient to produce a hydrated stuffing having the desired texture and moistness. Butter or other fats or oils may also be added as it has been found that such an ingredient improves the cohesiveness and texture of the stuffing. The mixture is then brought to a boil, the heat reduced and simmered for about 8 minutes, with occasional agitation. The 8 minute simmer step is required in order to properly rehydrate the dehydrated vegetables or fruit contained in the flavor pouch. This step can be omitted in those instances where these dehydrated components are not present in the composition.

The contents of the pouch containing the farinaceous crumb are then thoroughly mixed with the hot, soup-like flavor base, the saucepan covered and removed from the heat. The stuffing is ready to serve after permitting the mixture to stand for about 5 minutes.

The amount of water, flavoring, bread crumb, vegetables and the like used in preparing the stuffing of this invention will vary depending on the quantity of stuffing to be prepared. Where 3 cups of stuffing is desired, 1 ½ to 2 cups of water will properly hydrate 150 to 225 grams of dry mix. The moisture content of the stuffing composition should be at least 50 percent by weight, preferably 60 to 80 percent by weight. The crumb component comprises at least 50 percent by weight of the dry mix, preferably from about 60 to 95 percent by weight. Where significant amounts of rice or potato are included in the composition, the crumb is present at the lower end of the 60 to 95 percent range. The dehydrated fruit and/or vegetables, where used, are present within the range of about 1 to 30 percent by weight of the dry mix. The seasonings and flavor components are present to suit the taste.

The following examples are illustrative of the invention:

EXAMPLE I

Continuous process commercially available sliced white bread (½ inch slices) was conditioned using a continuous belt three stage forced air dryer manufactured by Procter and Schwartz. The dryer used was 47 feet long with a 31 foot long heating area. The heating area was divided into three separate zones such that the bread can be subjected to air at a different temperature in each zone. The belt was of wire mesh construction and the belt speed was set to advance at the rate of just under about 2 feet/min.

Slices of the bread having a moisture content of about 35–38 percent were placed on the belt and advanced through the dryer. The temperature of the forced hot air was 325°F in zone 1, 335°F in zone 2, and 200°F in zone 3. The bread was subjected to the drying conditions in each zone for about 6 minutes, with a total drying time of about 18 minutes.

The conditioned bread was recovered at the far end of the dryer and cooled. It was found to have a slightly tan color and a moisture content of about 4.5 percent.

EXAMPLE II

Continuous process sliced bread was conditioned using infrared as a heat source. The equipment employed was a continuous belt Steiner-Ives infrared oven. The heating area was about 7 feet long and the belt speed adjusted to about 1.5 ft./min. Heat was supplied in three heating stages with heating elements located above and below the belt.

Slices of the bread having a moisture content of about 35–38 percent were placed on the belt and advanced through the oven set for a temperature of about 350°F. After one 4.5 minute pass through the oven, the slices were turned over and again conditioned for about 4.5 minutes at 350°F. After cooling, the bread was found to have a moisture content of about 6 percent by weight.

EXAMPLE III

This example illustrates a process outside the scope of the present invention wherein continuous process bread is simply dried without exposure to conditioning temperatures of at least 200°F.

The continuous belt dryer employed in Example I was adjusted to provide a forced hot air temperature of 150°F throughout and the belt speed was adjusted to about 1 foot/min.

Slices of continuous process bread were placed on the belt and advanced through the dryer. After about 40 minutes of exposure to 150°F forced air, the slices were collected, cooled and found to have a moisture content of about 6 percent by weight.

The dried slices prepared according to Examples I, II and III were each ground, separated and screened to form crumb having the following approximate particle size distribution:

|  |  |  | Per Cent |
|---|---|---|---|
| On U.S. | 2 | Mesh (½" screen) | 0 |
| On U.S. | 2–⅔ | Mesh (⅜" screen) | 15 |
| On U.S. | 3–½ | Mesh | 20 |
| On U.S. | 7 | Mesh | 25 |
| On U.S. | 14 | Mesh | 20 |
| On U.S. | 50 | Mesh | 20 |
| Past U.S. | 50 | Mesh | trace |

EXAMPLE IV

Instant poultry stuffing was prepared using the screened crumb of Example I, II and III as follows: A stuffing flavor component was first prepared by forming an intimate mixture of the following ingredients:

| | Parts |
|---|---|
| Dehydrated Onion Chips | 6.00 |
| Hydrolized Vegetable Protein [HVP-3H3] | 4.40 |
| Air Dried Cross Cut Celery [⅛"] | 4.00 |
| Chicken Seasoning [Stange No. 7058] | 3.50 |
| Chicken Seasoning [Busch Boake Allen AF/400] | 2.00 |
| Dehydrated Parsley Flakes | 1.00 |
| Poultry Seasoning | 0.70 |
| Monosodium Glutamate [MSG] | 0.50 |
| White Pepper | 0.20 |

Three samples of stuffing were prepared using the crumb of Examples I, II and III respectively as follows:

To 22.3 grams of the flavor component mixture prepared above were added 1 ¾ cups of water and 4 tablespoons of butter in a 2 quart saucepan. The mixture was brought to a boil in the covered saucepan, after which the heat was reduced and the mixture allowed to simmer for about 6 minutes, with occasional stirring. Next, 150 grams of the screened conditioned bread crumb of Example I was added and the mixture stirred well to blend. The mixture was then removed from the heat, covered, and let stand for about 5 minutes.

Exactly the same procedure was used in preparing stuffing using the screened conditioned crumb of Example II and the screened dried crumb of Example III.

It was the opinion of an expert taste panel that the stuffing prepared using the crumb of Examples I and II had a firm texture and smooth mouthfeel associated with traditional baked stuffing. The stuffing prepared using the crumb of Example III was considered mushy or pasty with very little body and texture.

EXAMPLE IV

Corn bread stuffing was prepared from a two package system containing the following ingredients:

| Package 1 Ingredient | gms./pkg. | % |
|---|---|---|
| Corn Bread Crumb (Yeast leavened-non conditioned) | 87.50 | 43.59 |
| Conditioned White Bread Crumb of Example I | 87.50 | 43.59 |
| Package 2 | | |
| Dehydrated Onion Chips | 6.00 | 2.98 |
| Chicken Seasoning (Stange No. 7058) | 5.25 | 2.61 |
| HVP-3H3 | 4.40 | 2.19 |
| Cross Cut Dried Celery | 4.00 | 2.00 |
| Chicken Seasoning (Busch Boake Allen AF/400) | 3.00 | 1.49 |
| Parsley Flakes | 1.00 | 0.49 |
| Salt | 0.75 | 0.37 |
| Poultry Seasoning | 0.70 | 0.35 |
| MSG | 0.50 | 0.25 |
| White Pepper | 0.20 | 0.09 |
| Total | 200.80 | 100.00 |

Stuffing was prepared by mixing the contents of package No. 2 with water and butter, cooking, and adding the contents of package No. 1, as in Example IV. The stuffing had a texture and mouthfeel similar to traditional baked stuffing.

Beef or bacon flavored stuffing may be prepared by using the basic formulae of Examples IV or V and substituting the appropriate meat flavorings for the poultry flavorings used. Minor amounts of beef or bacon flavored vegetable protein analog may also be included in these formulae. Also, the texture of the stuffing of Example IV may be varied to suit individual tastes by employing mixtures of conditioned white crumb with up to 50 percent by weight of whole wheat or corn bread crumb. A blend of about 85 percent by weight of conditioned white crumb and 15 percent by weight of whole wheat crumb is especially suitable.

What we claim is:

1. A process for conditioning continuous process bread to render it suitable for use as crumb in a stuffing mix for hydration to form a stuffing composition comprising subjecting continuous process bread slices or pieces to a temperature within the range of 200° to 375°F. for a period of time sufficient to strengthen the cellular structure of the bread without causing toasting and excessive browning and sufficient to reduce the moisture content of the bread to below about 10 percent by weight, and grinding and screening said bread to form a crumb having a particle size such that at least about 95 percent by weight passes through a 2 mesh screen and no greater than about 5 percent by weight passes through a 50 mesh screen.

2. The process of claim 1 wherein the bread has an initial moisture content of at least 30 percent by weight.

3. The process of claim 1 wherein said continuous process bread is subjected to temperatures in excess of about 250°F. during at least part of the conditioning process.

4. The process of claim 2 wherein said conditioning is carried out by initially subjecting the bread to forced hot air temperatures within the range of 250° to 375°F. in at least one stage and less than 250°F. in a subsequent stage, the total conditioning time being up to aboout 20 minutes.

5. The process of claim 3 wherein the heat source in infrared.

6. The process of claim 1 wherein at least 50 percent by weight of said crumb ranges from 3 to 14 mesh in particle size.

7. A conveniently packaged stuffing mix for hydration to form a stuffing composition comprising:
   a. a stuffing flavor component comprising a mixture of condiments with dehydrated vegetables or dehydrated fruits or mixtures of said dehydrated vegetables and fruits, and
   b. a crumb component comprising the crumb resulting from the process of claim 1,
each of said components being packaged separately to form a segregated unit package.

8. A process for preparing a stuffing composition comprising combining a stuffing flavor component comprising a mixture of condiments with dehydrated vegetables or dehydrated fruits or mixtures of said dehydrated vegetables and fruits with water in an amount sufficient to produce a hydrated stuffing composition having desired texture and mouthfeel, heating said component and water for a period of time sufficient to properly rehydrate said dehydrated vegetables or dehydrated fruits or mixtures of said dehydrated vegetables and fruits, and mixing therewith a sufficient amount of a crumb component comprising the crumb resulting from the process of claim 1 to provide a hydrated stuffing composition having a moisture content of at least 50 percent by weight.

* * * * *